United States Patent
Engle et al.

(10) Patent No.: US 7,413,312 B2
(45) Date of Patent: Aug. 19, 2008

(54) PROJECTION DEVICE AND SCREEN

(75) Inventors: T. Scott Engle, Tualatin, OR (US); Jeffrey A. Gohman, Hillsboro, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

(21) Appl. No.: 11/463,572

(22) Filed: Aug. 9, 2006

(65) Prior Publication Data

US 2006/0290897 A1  Dec. 28, 2006

Related U.S. Application Data

(63) Continuation of application No. 10/825,732, filed on Apr. 15, 2004, now Pat. No. 7,090,354, which is a continuation-in-part of application No. 10/754,093, filed on Jan. 6, 2004, now Pat. No. 7,150,537, which is a continuation-in-part of application No. 10/222,083, filed on Aug. 16, 2002, now Pat. No. 6,896,375.

(51) Int. Cl.
G03B 21/14 (2006.01)
H04N 5/64 (2006.01)

(52) U.S. Cl. .................................. 353/79; 348/836
(58) Field of Classification Search .................. 359/70, 359/74, 76, 79, 67, 449, 461; 348/836, 843, 348/787–788, 794
See application file for complete search history.

(56) References Cited

U.S. PATENT DOCUMENTS

| | | | | |
|---|---|---|---|---|
| 3,944,734 A | * | 3/1976 | Ogawa | 348/788 |
| 4,060,310 A | * | 11/1977 | Brown | 359/461 |
| 4,245,256 A | * | 1/1981 | Kokubo et al. | 348/789 |
| 4,281,352 A | * | 7/1981 | Hoffman | 348/788 |
| 4,385,313 A | * | 5/1983 | Slater et al. | 348/788 |
| 4,479,144 A | * | 10/1984 | Yamazaki et al. | 348/788 |
| 5,982,537 A | * | 11/1999 | Koizumi et al. | 359/444 |
| 6,379,012 B1 | * | 4/2002 | Enochs et al. | 353/79 |
| 6,466,369 B1 | * | 10/2002 | Maddock | 359/460 |
| 6,520,464 B1 | * | 2/2003 | Morrissey et al. | 248/222.52 |
| 6,530,664 B2 | * | 3/2003 | Vanderwerf et al. | 353/74 |
| 6,637,896 B2 | * | 10/2003 | Li et al. | 353/119 |
| 6,806,850 B2 | * | 10/2004 | Chen | 345/7 |
| 6,866,388 B2 | * | 3/2005 | Yang | 353/70 |
| 7,270,423 B2 | * | 9/2007 | Katase | 353/79 |
| 2002/0118151 A1 | * | 8/2002 | Chen | 345/84 |
| 2007/0195210 A1 | * | 8/2007 | Rudzki | 348/838 |

* cited by examiner

Primary Examiner—Christopher Mahoney
(74) Attorney, Agent, or Firm—Alleman Hall McCoy Russell & Tuttle LLP

(57) ABSTRACT

A projection system. The projection system includes a projector, a projector holder, and, optionally, a screen. When included, the screen has at least a deployed configuration in which a viewing portion of the screen is substantially planar. The projector includes a wide-angle lens system to selectively project display images onto the projection screen or other viewing surface. The projector holder supports the projector and is moveable relative to the projection screen or other viewing surface. The projector holder has at least an operating position at which the projector is supported for projection onto the projection screen or other viewing surface.

12 Claims, 9 Drawing Sheets

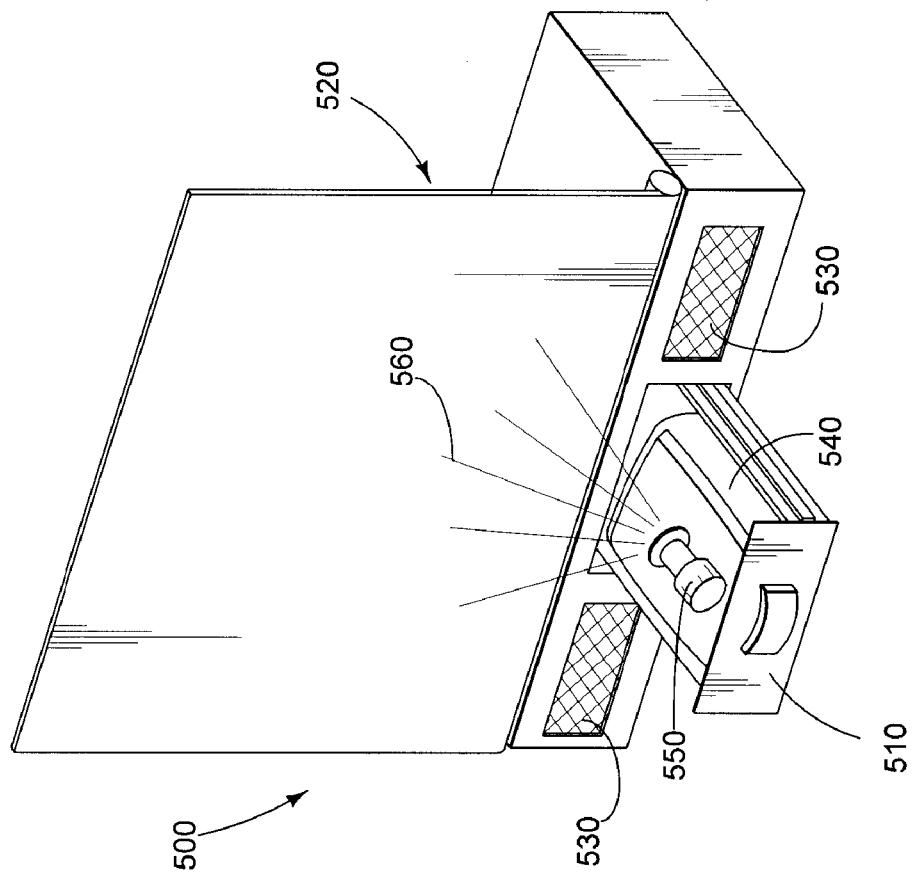
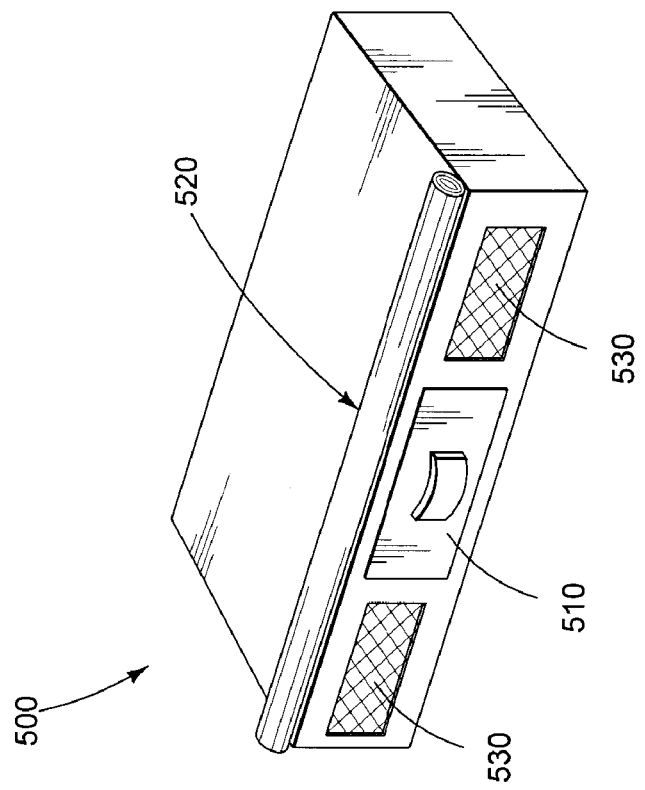

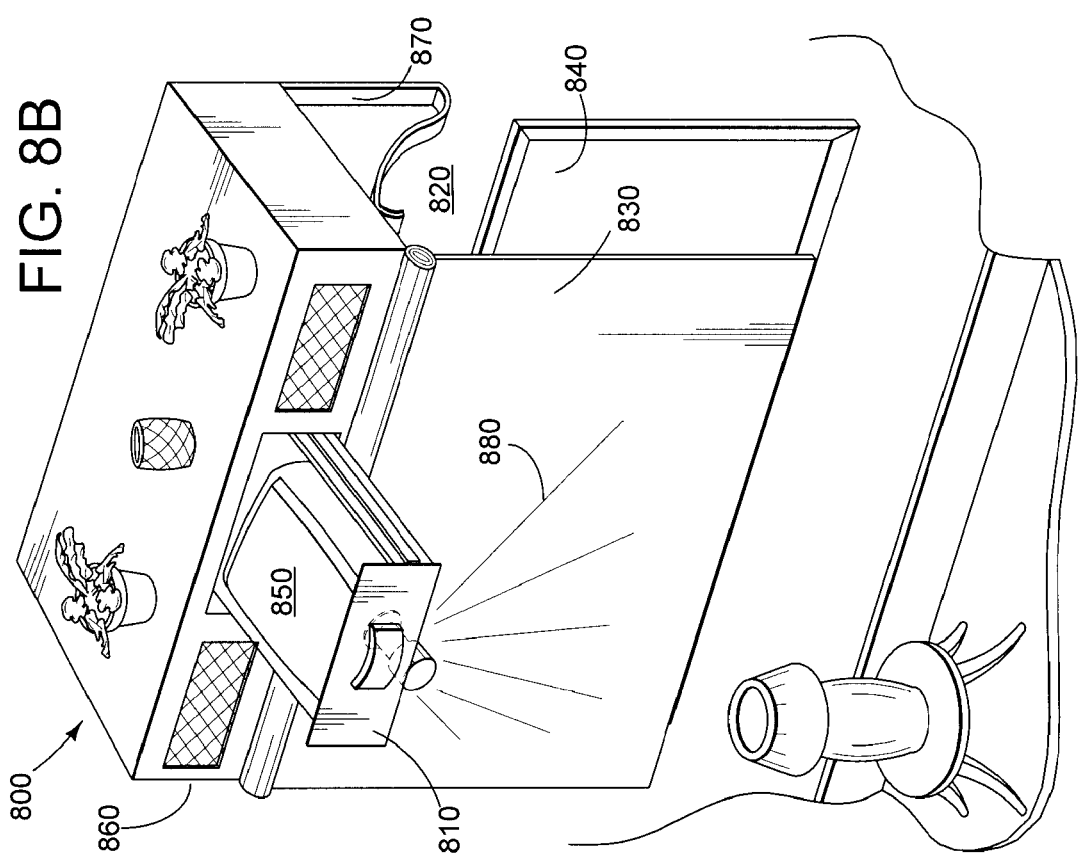
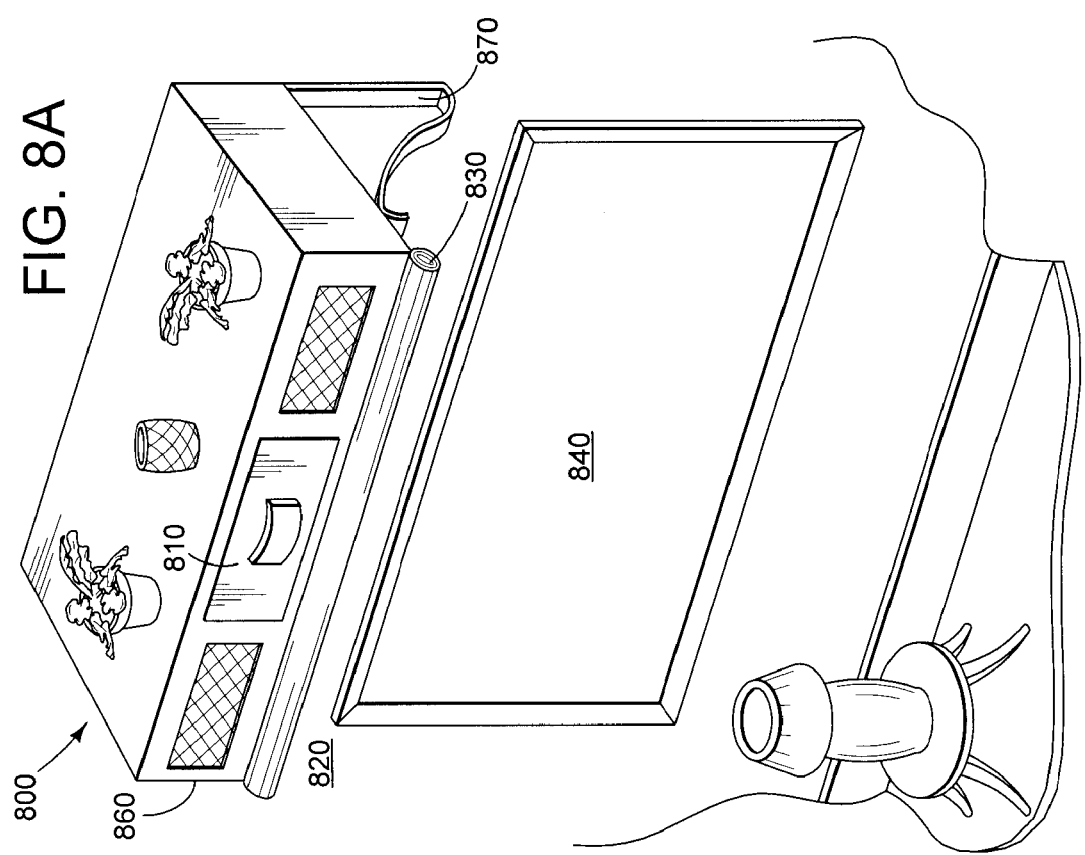

PROJECTION DEVICE AND SCREEN

CROSS-REFERENCE TO RELATED APPLICATIONS

The present application is a continuation of U.S. Ser. No. 10/825,732, filed Apr. 15, 2004, which is a continuation-in-part of U.S. Ser. No. 10/754,093, filed Jan. 6, 2004, which is a continuation-in-part of U.S. Ser. No. 10/222,083, filed Aug. 16, 2002 (now U.S. Pat. No. 6,896,375, issued May 24, 2005), which is related to U.S. Ser. No. 10/222,050, filed Aug. 16, 2002 (now U.S. Pat. No. 7,009,765, issued Mar. 7, 2006). Each of these applications is incorporated herein by reference in its entirety for all purposes.

FIELD OF INVENTION

The embodiments of the present disclosure relate generally to image display devices, and more particularly, to projection devices, screens and units for projection devices and screens.

BRIEF DESCRIPTION OF THE DRAWINGS

Various aspects of the invention are illustrated by way of example and not by way of limitation in the figures of the accompanying drawings, in which the like references indicate similar elements and in which:

FIGS. 5A and 5B illustrate a projection unit according to an embodiment of the present disclosure.

FIGS. 6A, 6B, 7A, 7B, 8A, and 8B illustrate various configurations of projection units according to several embodiments of the present disclosure.

DETAILED DESCRIPTION

Figure 1:
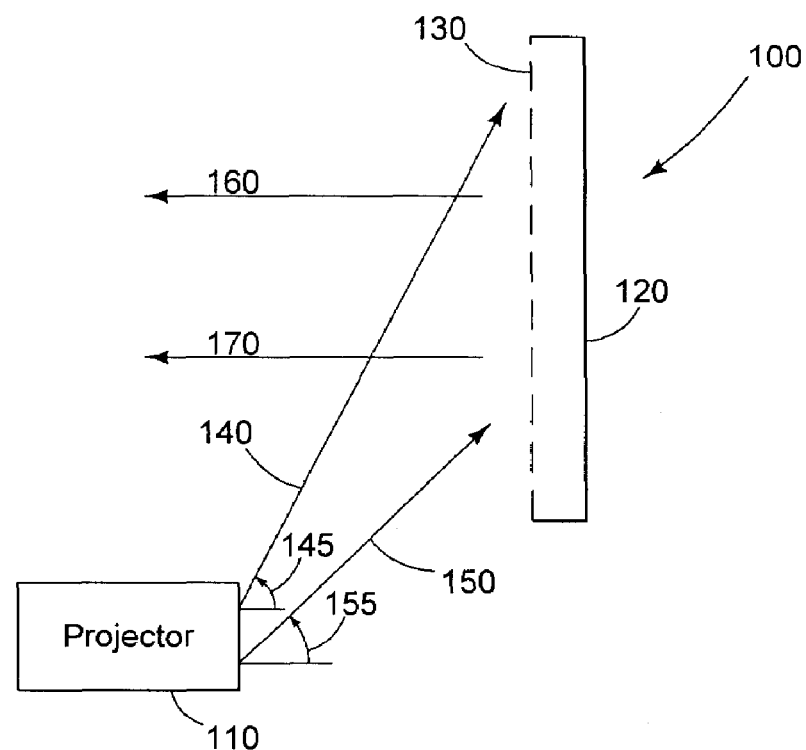
FIG. 1 is a schematic illustration of a front projection display device according to an embodiment of the present disclosure.

FIG. 1 illustrates schematically, at 100, a front projection display device. Front projection display device may include a projector 110 and a screen 120. Screen 120 may include a screen surface 130. Projector 110 may be configured to generate an image and to project the image on screen surface 130. The screen 120 may reflect the projected image and direct it toward a viewer (not shown). In some embodiments, screen surface 130 may scatter light so that the projected image is visible to the viewer. Although shown and described in relation to a front projection device where the image displayed is on the same side as the projection device, it should be appreciated that the present disclosure may be applicable to rear projection devices.

Briefly, projector 110 may include a light source and/or image source. The image source may include image-generation devices, including, but not limited to, digital micromirror devices (DMD), microelectromechanical systems (MEMS), grating light valve devices (GLV), liquid crystal display devices (LCD), liquid crystal on silicon devices (LCOS), etc.

Projector 110 may further include a lens system which may be integrated within projector 110 or otherwise coupled to projector 110 such that an image generated by the light source or image source is projected to a screen surface 130 as indicated by arrows 140, 150. The image may be displayed to a viewer as indicated by arrows 160, 170.

Screen surface 130 may include various surface features to improve display of the image to a viewer. For example, screen surface 130 may be any suitable image display surface, including, but not limited to a wall, a coated surface or other specialized surface, such as a glass-bead screen surface, a bumpy screen surface, etc. It should be appreciated that in some embodiments, screen 120 may be a Fresnel lens type screen, however other suitable screens or surfaces may be used.

Returning to FIG. 1, projector 110 may be configured to project light at a steep angle from the horizontal to screen surface 130 of screen 120. For example, projector 110 may be offset from screen 120 such that light is projected onto screen surface 130 at a substantially steep angle. For example, in some embodiments, light may be projected at an angle between approximately 30 to 80 degrees from the horizontal. It should be appreciated that in other embodiments, the light may be projected to screen surface 130 at other angles, including but not limited to angles between 20 to 90 degrees or angles there between. The angle of reflection may vary along screen surface 130.

Rays 140 and 150 illustrate exemplary paths that light may travel from projector 110 to screen 120. For exemplary purposes only, ray 140 is shown reflecting and diffusing off of screen surface 130 at an angle 145. Angle 145 may be any suitable angle, such as an 80-degree angle. Similarly, ray 150 is shown reflecting off of the screen at angle 155. Angle 155 may be any suitable angle, for example angle 155 may be a 30-degree angle. Rays 160 and 170 illustrates the path that light may travel after reflecting off of screen 120. Rays 160 and 170 show the image being reflected to a viewer (not shown).

In one embodiment of the present disclosure, projector 110 may include a wide-angle lens system. In one exemplary wide angle system, illustrated schematically in FIG. 2, system 200 may include a relay lens stage 210 and a wide angle lens stage 220. Relay lens stage 210 may be configured to generate and project an intermediate image 230 to wide angle lens stage 220. Wide angle lens stage 220 may be configured to generate and project corrected image 240 for display on screen 250 (which can include screen 120, for example).

Intermediate image 230 may be considered a distorted image (I(D)) such that wide angle lens stage 220 receives a predistorted image. The distortion caused by wide angle lens stage 220 may be such that the distortion of intermediate image 230 is substantially compensated for (substantially cancelled) by wide angle lens stage 220 to generate image (I(−D)). The reference (I(−D)) is intended to indicate an image substantially without the distortion of the intermediate image 230. It should be appreciated that the distortion may be to the image shape and/or the focal plane.

For purposes of the present description, the term "distortion," is intended to include any change from the initial image inputted into the predistortion system. For example, in some embodiments, a distortion in the image may include an alteration in the shape of at least a portion of the image. The term "predistortion" is intended to include an intentional distortion of an optical image that compensates for (i.e. is substantially equal and opposite to) distortion generated by wide angle lens stage 220. It will be appreciated that the predistorted image may be presented in a variety of different configurations depending on the type of downstream distortion for which the predistorted image is intended to compensate.

Figure 2:
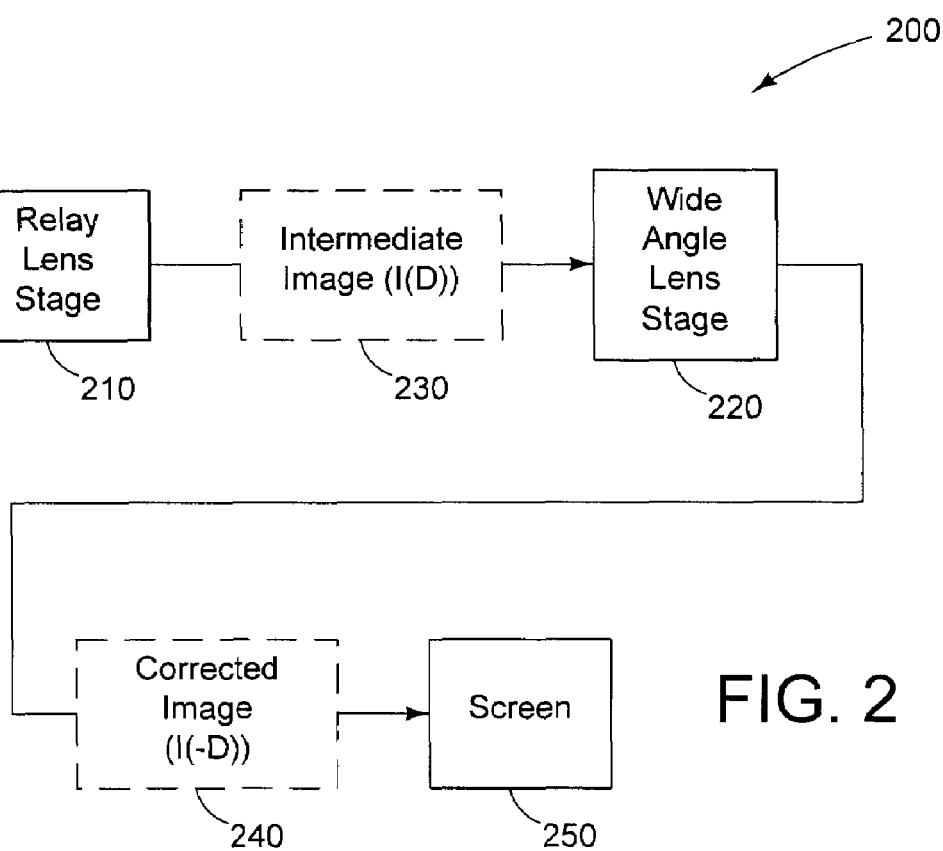
FIG. 2 is a block diagram of a lens system that may be used in the front projection display device of FIG. 1 according to an embodiment of the present disclosure.

The system described in FIG. 2 may include additional optics (not shown). For example, the system may include one or more prisms, etc. to direct the image along a desired light path. Moreover, there may be one or more lenses configured to alter the intermediate image or the corrected image.

Figure 3:
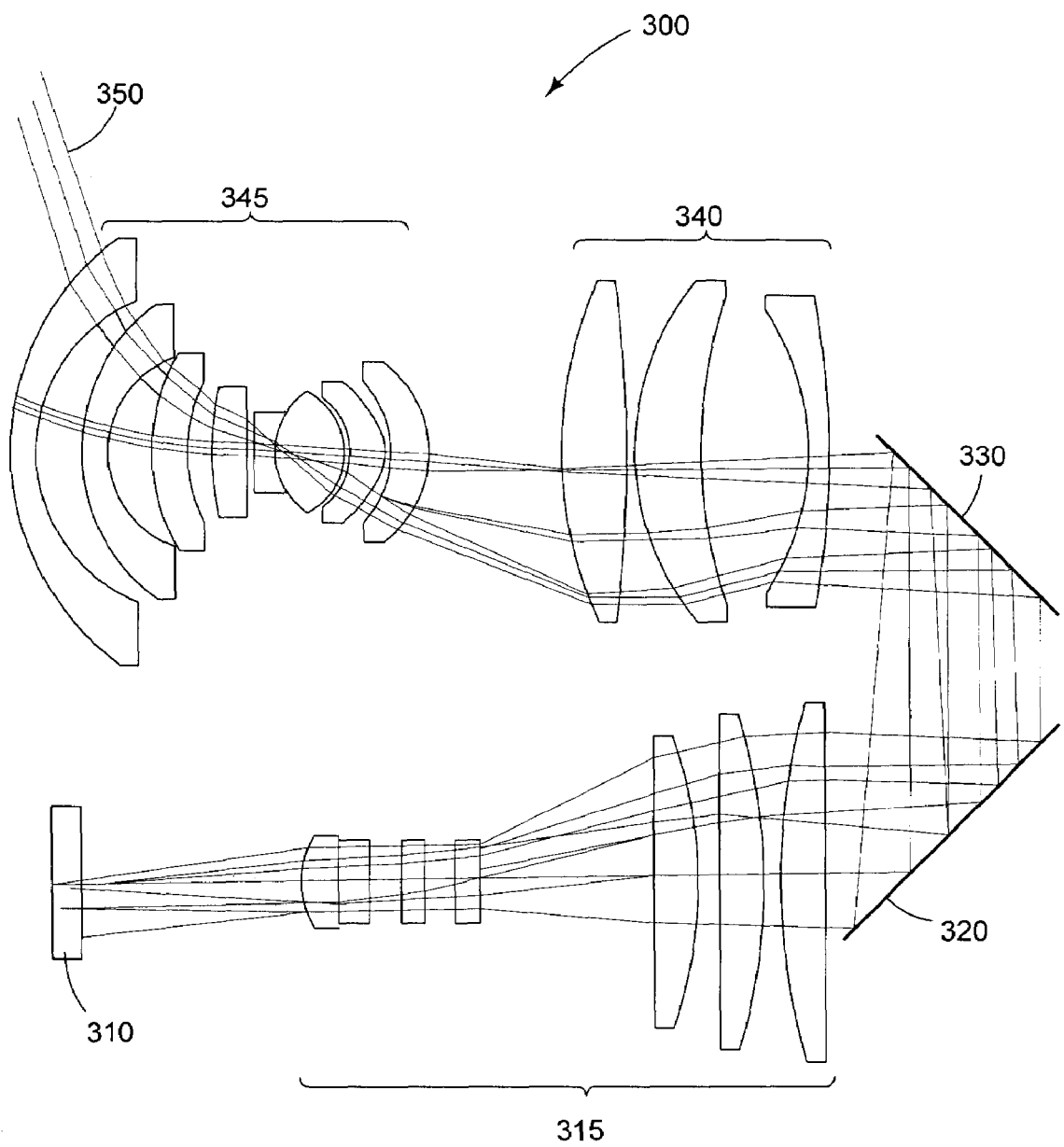
FIG. 3 is a schematic illustration of a lens system that may be used in the front projection display device of FIG. 1 according to an embodiment of the present disclosure.

FIG. 3 is a schematic illustration of an exemplary lens system, indicated generally at 300, which may be used in the display device of FIG. 1. As illustrated, the system may include an image-generation device, e.g. DMD 310, adapted to provide an image to the lens system. An image can be provided to DMD 310 in any manner known in the art. DMD 310 may be configured to selectively reflect light from any suitable light source (not shown) to the lens system. Other types of devices (e.g., microelectromechanical systems (MEMS), grating light valve (GLV), liquid crystal display (LCD), liquid crystal on silicon (LCOS), etc.) may be used to provide an image to the lens system.

In the exemplary lens system 300, the image path includes multiple folds. Specifically, the image path is directed through a first relay lens group 315, through direction-changing optics 320 and 330 to a second relay lens group 340, and then to a wide angle lens system 345. In the illustrated configuration, light (the image path) is redirected from a first input direction to a second output direction.

Any suitable optical arrangement may be used to change the direction of light. In the exemplary embodiment, planar direction changing elements, such as two fold mirrors or prisms 320 and 330, may be used so that the direction of light is changed or turned by approximately 180 degrees. Specifically, each prism 320 and 330 may provide an approximately 90° fold of the image path. In alternative embodiments, the two fold angles may be different from each other, but still produce an approximately 180 degree change in the image path. The multiple fold arrangement may be adapted to reverse the light direction such that output light is redirected substantially back toward the direction that the input light entered the system (albeit different horizontal planes). Other optical devices and number of folds of the image path may be used without departing from the scope of the invention. For example, other combinations of prisms and/or mirrors may be used to alter the image direction 180 degrees or more. Moreover, the fold is not required. Alternatively, or additionally, other fold angles, for example, 45°, 30°, 135°, 180°, etc. could be used.

The lens system 300 in FIG. 3 may be configured to produce a distorted intermediate image as described in relation to FIG. 2. The distortion of the intermediate image may be substantially corrected using wide angle lens stage 345 which may create distortion substantially equal and opposite to the distortion of the intermediate image. In some embodiments, the distortion of the intermediate image may be created by the use of a relay lens stage, such as one of or both of the first and second relay lens groups 315, 340.

Each of these lens systems may be considered to have a predistortion system, such as the first relay lens stage and/or the second relay lens stage (315, 340), which is configured to create a predistorted image (or intermediate image) from an original image. The lens systems may further be understood to have a receiving projection system, such as the wide angle lens system 345, which is configured to receive the predistorted image and distort the image to substantially cancel the predistortion of the predistorted image and to project a substantially non-distorted image corresponding to the original image.

Still referring to FIG. 3, in one embodiment, lens groups 315 and 340 may include any number of suitable lenses, based on, for example, the desired distortion of the intermediate image, or the overall size of the lens system. The distortion to be caused by relay lens groups 315 and 340 may be substantially equal and opposite the distortion caused by wide angle lens group 345. In one embodiment, the intermediate image is approximately a half circle image in a warped image plane. In alternate embodiments, other types of distortion may be used. For example, if the full lens field is to be used, the distorted intermediate image may be a generally circular image. The image plane may or may not be warped.

Wide angle lens group 345 projects the distorted intermediate image to a screen for display. Because wide angle lens group 345 causes distortion to the image to be projected and the intermediate image has been pre-distorted by relay lens groups 315 and 340, the resulting image projected by the lens system has little or no distortion. In one embodiment, the total distortion caused by relay lens groups 315 and 340, wide angle lens group 345 and any associated prisms may be less than 3%, or less than 10%.

Figure 3A:
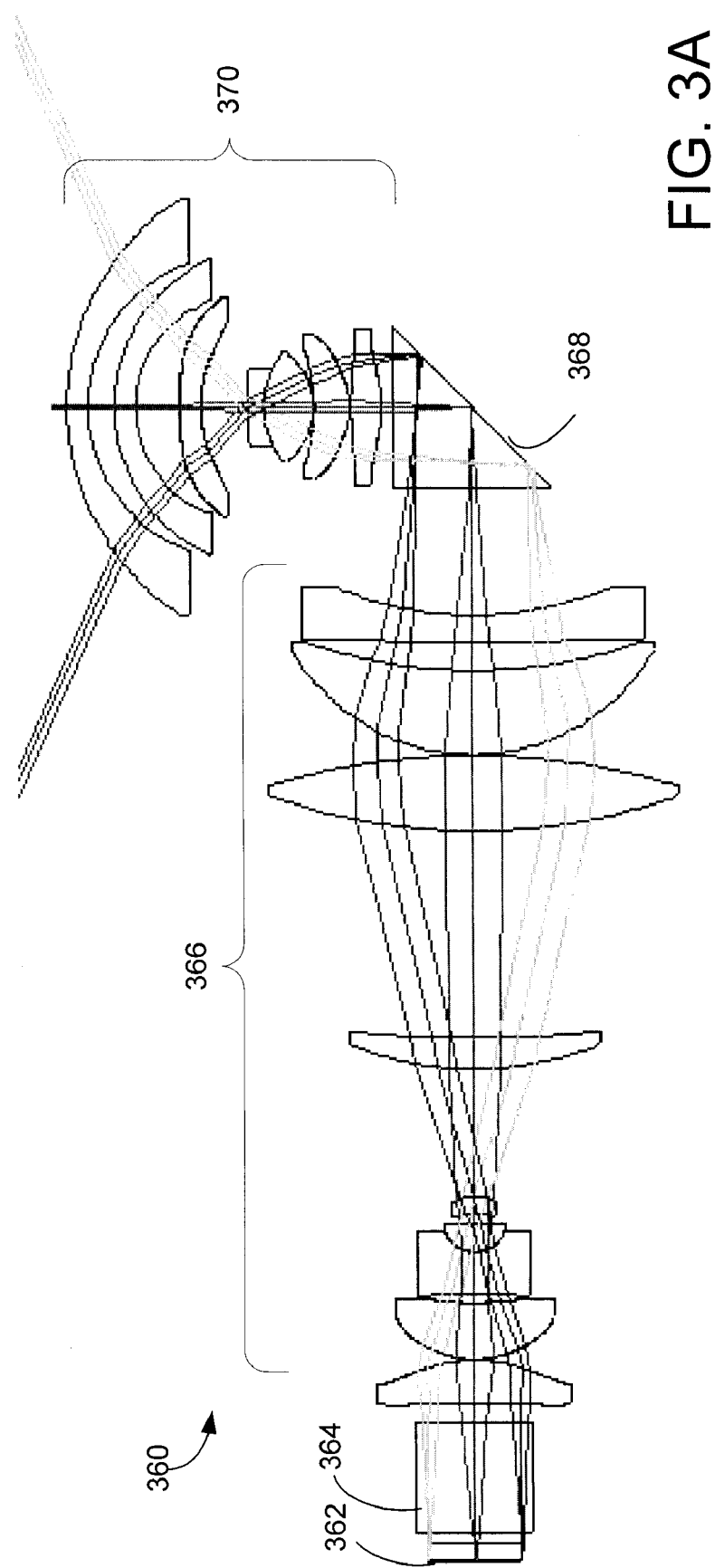
FIG. 3A is another schematic illustration of a lens system that may be used in the front projection display device of FIG. 1 according to an embodiment of the present invention.
Figure 3B:
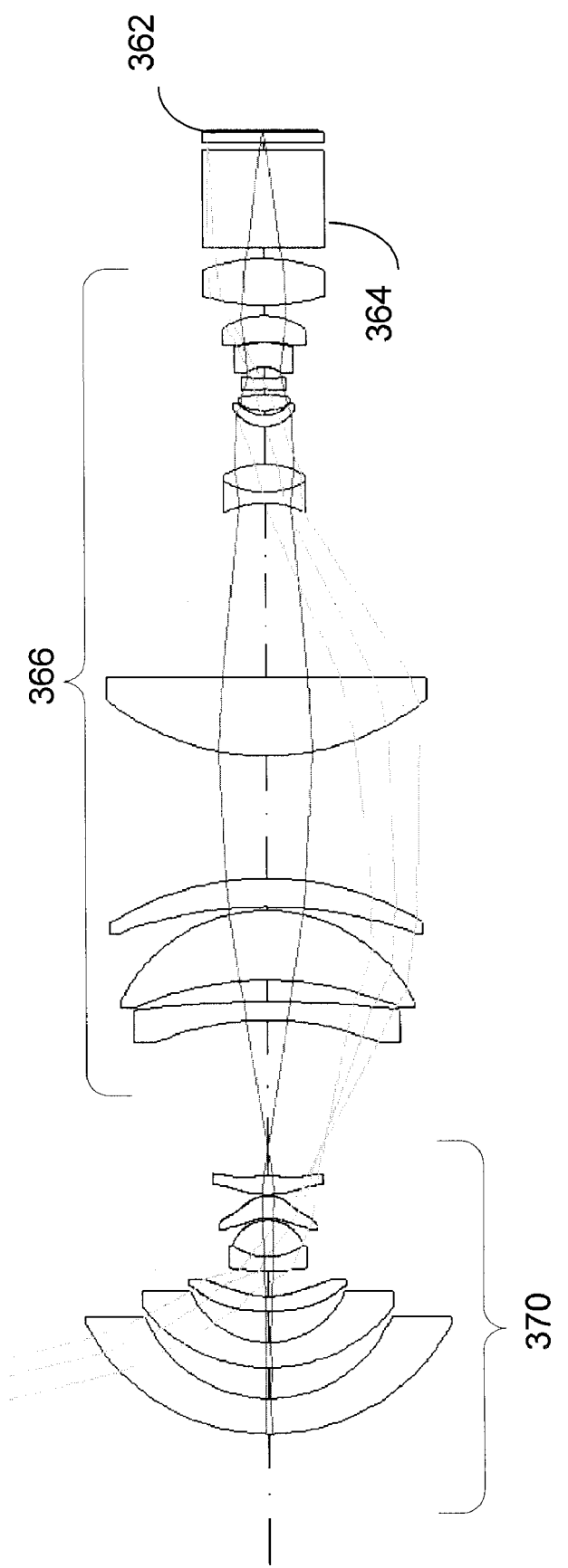
FIG. 3B is another schematic illustration of a lens system that may be used in the front projection display device of FIG. 1 according to an embodiment of the present invention.

While the above example includes multiple folds, in an alternative embodiment a system with only a single fold (e.g., of 90 degrees, for example), or without the folds provided by direction-changing optics 320 and 330, can be used, as illustrated by FIGS. 3A and 3B discussed below. For example, a system can be used in which the image path is directed through an equivalent to the combination of lens groups 315, 340, and 345 without changing direction.

In some embodiments, the lens system may be configured to direct the image to a screen at a steep angle. For example, the lens system may be configured to direct the light at an angle of approximately 30 to 80 degrees toward a screen. The light may impinge the screen on a first side and be redirected back toward a viewer on the same side (first side) of the screen. In this example, by using multiple folds, a compact and lightweight projection device may be produced.

In one embodiment, the optic axes of the lenses of relay lens group 315 may be aligned. Similarly, the optic axes of the lenses of wide angle lens group 345 also may be aligned. In an alternative embodiment, DMD 310 is offset from the optic axis of lens groups 315 and/or 340 such that only a portion (e.g., between 90% and 80%, 80%-70%, 70%-60%, 60%-50%, 50%-40%, 40%-30%, 30%-20%, 20%-10%, 80%-40%, 40%-10%, or therebetween) of the available lens field is used. By offsetting DMD 310 with respect to the optic axis of lens groups, the image from DMD 310 may be projected by lens groups 315, 340, and/or 345 in the upper portion of the lens field to the screen. Alternatively, a lower portion of the lens field may be used to project an image to the screen, if desired.

Typically, wide angle lens group 345 provides a field angle of greater than 100°. For example, lens system 345 can have a field angle of 152° or more. It should be understood that lenses having greater or lesser field angles also may be used. For example, the field angle can also be 130° or more. In one embodiment, the field angle is 153°; however, other angles can be provided. In some embodiments, the optical axis of wide angle lens group 345 is substantially perpendicular to the screen so that keystone, or trapezoidal distortion may be reduced.

As described above, the image may be projected to a screen or a wall. In some embodiments, the screen may be a flexible plastic screen. In another embodiment, the screen may be a portion of a Fresnel lens type screen. In one embodiment, a Fresnel lens type screen with multiple concentric grooves having one or more predetermined groove angles may be used. Further, there may be regions or zones with different groove angles, pitches, or groove depths. The Fresnel lens type screen can be designed to accommodate light received from a steep angle, such as in the system shown in FIG. 1. It should be noted that the angle of the grooves and the reflection angle may vary to accommodate the angle of the input light.

Other types of screen surfaces and screens may be used to accommodate a steep angle projector as shown in FIG. 1. For example, the screen may be a lenticular screen, a single-sided Fresnel lens type screen, a linear prism sheet, a double-sided lenticular screen, a glass bead screen, etc. Each of the above screens may be configured to receive light from a steep angle, such as from the wide-angle lens system 300 described above. Each screen may further be configured with surface topographies that are adapted to reflect light back to a viewer along a horizontal plane or other suitable viewing plane. Moreover, such screens may include surface topographies configured to reduce stray ambient light, which may substantially effect production of the image.

FIG. 3A illustrates another exemplary embodiment of a wide angle system described above. As illustrated, the lens system 360 may include a DMD 362 adapted to provide an image to the lens system. As noted above, an image can be provided to DMD 362 in various ways.

Although other devices may be used to provide an image to the lens system, in the illustrated embodiment, optical direction element 364 directs the image to relay lens group 366. Relay lens group 366 projects the image from optical direction element 366 to a directional element, such as a prism 368. Relay lens group 366 may be configured to distort the image such that intermediate prism 368 receives an intentionally distorted intermediate image.

In one embodiment, relay lens group 366 includes 9 lenses; however, any number of lenses can be used, based on, for example, the desired distortion of the intermediate image, or the overall size of the lens system. The distortion to be caused by relay lens group 366 may be equal and opposite the distortion caused by wide angle lens group 370. In one embodiment, the intermediate image is approximately a half circle image in a warped image plane. In alternate embodiments, other types of distortion may be used. For example, if the full lens field is to be used, the distorted intermediate image would be a generally circular image. The image plane may or may not be warped.

Intermediate prism 368 may provide a 90° fold of the image path, however other configurations are contemplated and are within the scope of the invention. For example, other fold angles, e.g., 45°, 30°, 135°, 180°, etc. could be used. Moreover, multiple folds may be used as shown in FIG. 3.

The distorted intermediate image may then be directed though a wide angle lens group 370 as described above. Briefly, wide angle lens group 370 may correct the distortion of the intermediate image such that the resulting image projected by the lens system is substantially without distortion. In one embodiment, the total distortion caused by relay lens group 366, wide angle lens group 370 and any associated prisms may be less than 3%, or less than 5%, or less than 10%.

In one embodiment, the optic axes of the lenses of relay lens group 366 may be aligned. Similarly, the optic axes of the lenses of wide angle lens group 370 also may be aligned. In some embodiments, the optical axis of wide angle lens group 370 is perpendicular to the screen so that keystone, or trapezoidal distortion may be reduced.

FIG. 3B illustrates another embodiment of a wide angle lens system having a distorted intermediate image. The lens system of FIG. 3B is similar to the lens system of FIG. 3A except that the lens system of FIG. 3B is not folded. That is, wide angle lens system 370 may be co-axial with relay lens system 366.

Figure 4:
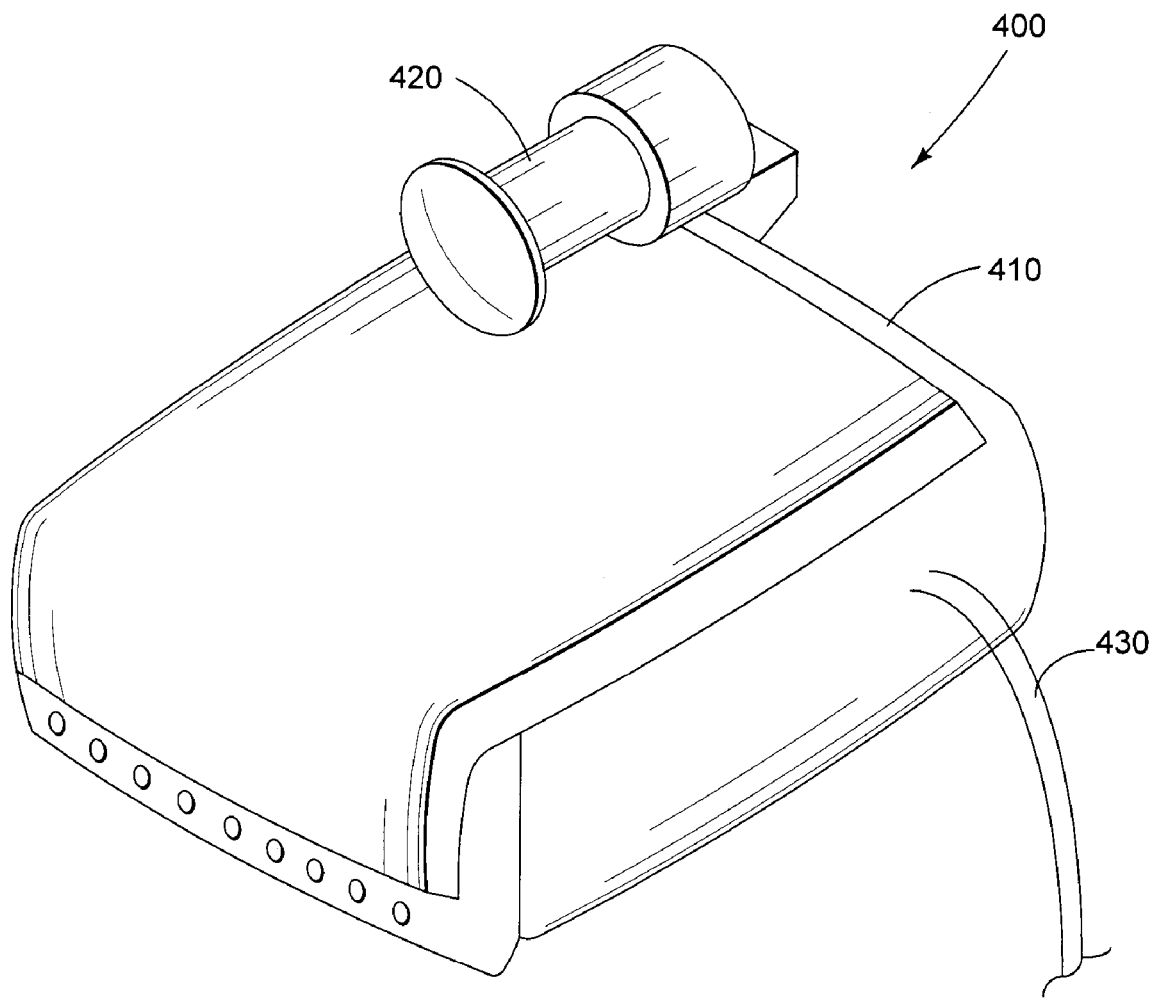
FIG. 4 illustrates a projector with the lens system shown in FIG. 3 according to an embodiment of the present disclosure.

FIG. 4 further illustrates, at 400, a projection system including a lens system 420 (such as the lens system discussed above in relation to FIG. 3) coupled with a projector 410. As illustrated, lens system 420 may be coupled to projector 410. In some embodiments, lens system 420 may be removably coupled to projector 410. Alternatively, lens system 420 may be integrated into projector 410. By using the multiple fold system of FIG. 3, the length of the lens may be decreased creating a more compact projector system. The orientation of the lens system 420 relative to the projector 410 enables the main body of the projector 410 to be positioned in close proximity to a wall. Such a configuration may reduce the shelf space required for the projector when in operation, while still providing a reduced throw distance required by the lens system. For example, the projector 410 of FIG. 4 may be placed substantially next to a wall or display surface (e.g. within 2 to 10 inches from a wall or display surface) while producing a large image (e.g. a 50-inch to 100-inch image).

The system 400 of FIG. 4 further may be adapted to offset the display device up. In contrast to some previous display systems, where the offset of the display device is down, and the displayed image is offset up above the plane of the projector, the present system is set such that the display device is offset up in order to make the image offset up. For example, in some embodiments in the present system, the intermediate image produced by the lens system may require an offset. For example, in FIG. 3, folding the lens and reversing the light direction may function to put the display offset into a desired position.

In some cases, projector system 400 of FIG. 4 may be used in a person's home as a television, projector, home-entertainment system, etc. Alternatively the projection system 400 may be used in a business environment. In some embodiments, the system 400 may be integrated within a cabinet or other like device. In other embodiments, system 400 may be configured to be hung as a wall display, similar to a picture hanging on the wall (see for example FIGS. 8A and 8B).

As described above, the projector system 400 of FIG. 4 may be configured to project an image at a steep angle to a screen or viewing surface, or to a wall, for example. Such a projection system may thus require little space and thus may be easy to use in a wide variety of environments. Moreover, the projector may be placed substantially close to the viewing surface, wall, or screen, thereby reducing shadows caused by movement of objects, e.g. people walking through the light path, or other objects that may be intermittently or permanently present in the light path. For example, in the described embodiment, the image display will not be interrupted by a presentor walking around the room, or audience members raising their hands, or other viewers moving throughout a presentation room. Since the image is thrown only a short distance, such movements and interruptions will not generate disruptive shadows in the image. Moreover, such a configuration may be used in systems such as those described below where the system may be easily stored and set up for use without having to repeatedly pack up and un-pack a projector.

Projector 410 may further include one or more cords (a single cord is shown for illustrative purposes at 430). Such cords may include, but are not limited to power cords, network cords, etc. As described above, projector 410 with lens system 420 may be configured to project an image to a substantially adjacent screen or wall surface. Thus, it may be possible to position projector 410 relatively close to a wall or other image surface. The wall may include one or more outlets for receipt of such cords. In some embodiments, cord 430 may be easily received in a wall outlet substantially adjacent the projector. Thus, unlike previous systems, where cords draped from a projector across the room to an outlet, the cords may instead run along the wall to a suitable outlet without presenting an obstacle to presenters and audience members in the room. Moreover, the proximity of the projector to the wall may enable shorter cords to be used with the system.

Various mounting units may be used to mount projection system 400. For example, the projection system may be mounted in an entertainment unit or structure, also referred to as a mounting unit. Referring now to FIGS. 5A and 5B, an exemplary mounting unit for a steep angle front projection system, including both a projector and a screen, is shown. Specifically, FIG. 5A shows a cabinet type structure, cabinet 500, with a slidable/moveable member or element, such as drawer 510, adapted to support a projector (indicated at 540 in FIG. 5B). The slidable/moveable element may enable selective lateral positioning of the projector (selective positioning of projector in one or more positions in a plane substantially perpendicular to the plane of a display surface) as described in more detail below. Briefly, the projector may be selectively moved into one or more operation positions and/or a storage position. In the operation positions, the projector may be configured to project an image at a substantially steep angle to a substantially adjacent screen. For example, the projector may be configured to project an image to the screen at an angle of at least 30 degrees.

It should be noted that in some embodiments, a cabinet 500 may be part of the projection unit described above. The depth of the cabinet may be based on the depth or size of the projector. Alternatively, the cabinet may be a single-sided such that the cabinet does not include a top, sides or other similar structure. The single-sided cabinet may be adapted to have a drawer 510 adapted to support the projector. Such single-sided cabinet may be mounted in a secondary frame or other suitable structure.

The cabinet-type structure in combination with a wide-angle lens system or other lens system capable of producing a large image within a short distance, may be configured to enable a front projection device to be positioned in substantially close proximity or substantially adjacent to the viewing surface or screen. Thus, the integrated system does not require the projector to be displaced a significant distance from the viewing surface, thus providing a more compact and space-efficient unit.

In one embodiment, a moveable and/or flexible screen may be used in combination with the projector and such screen may be stored in a rolled position, as indicated at 520. In some embodiments, screen 520 may be moveable between a first position and a second position. In some embodiments, one of the first position and the second position may be a storage position. For example, in FIG. 5A, rolled screen 520 is shown mounted to a top, front edge of cabinet 500. However, it should be appreciated that screen 520 may be coupled to any suitable portion of cabinet 500. Moreover, in some embodiments, screen 520 may be in a fixed open position. For example, screen 520 may be integrated within a frame extending from cabinet 500. It further should be appreciated that screen 520 may be removably mounted to cabinet 500. In other embodiments, screen 520 may be separate and independent from cabinet 500.

The screen may be spring-loaded in the closed (rolled) or open (un-rolled) position, to ease opening and/or closing. Further, a latch and/or other locking mechanism can be used to retain the screen in the open and/or closed position. In some embodiments, a tensioning mechanism, such as but not limited to, a spring force mechanism, a locking mechanism, a frame, etc., may operate to maintain tension on the screen when in the open position. By tensioning the screen, it may be possible to reduce distortion caused by flex of the screen.

In some embodiments, a projector may be removably mounted to a top side of drawer 510. The drawer 510 can be slidably mounted to cabinet 500 via a sliding mechanism, such as roller bearings, sliding bearings, etc., such that the drawer can be moved between a closed position (shown in FIG. 5A) and an open position (shown in FIG. 5). The sliding drawer 510 may be configured to allow the projector to slide perpendicular relative to screen 520. In some embodiments, the drawer or other slidable support member may include a mirror to reflect an image projected by projector 540 to screen 520 when in an operable position.

It should be appreciated that although a drawer 510 is illustrated in FIGS. 5A and 5B, the slidable member may be other devices. For example, the projector may be mounted on rails, tracks, roller bearings, wheels, sliding bearings, etc. which may enable the projector to slidably move between at least a first position and a second position. A user may be able to manually position the projector in a desired location along the rails or tracks. In other embodiments, the projector may automatically move to preselected positions along the rails or tracks depending on the intended use or operation of the projector. For example, and not as a limitation, the automatic motion may be powered via an elector motor actuated by a user switch.

Figure 6B:
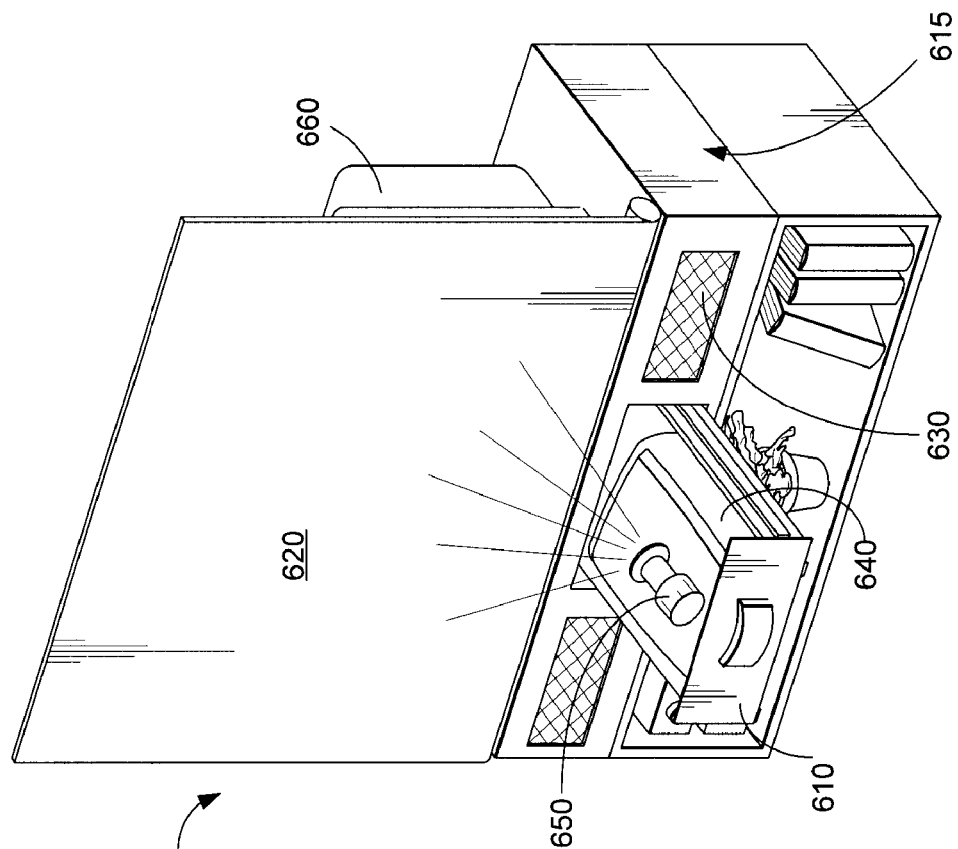
Figure 6A:
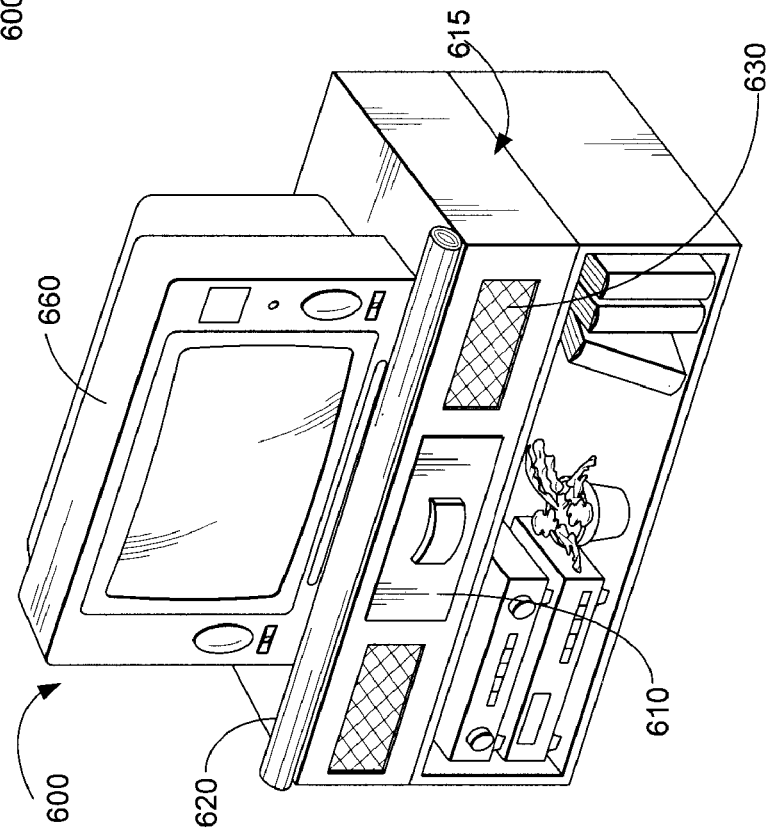

Cabinet 500 may include additional features. For example, in some embodiments, cabinet 500 may include audio-producing units, such as speakers. Thus, in the illustrated embodiment, speakers may be optionally mounted into cabinet 500 behind covers 530. It should be appreciated that other configurations for mounting speakers or other devices may be used without departing from the scope of the invention. Moreover, the cabinet may include opening for storing various goods. For example, FIGS. 6A and 6B show a cabinet including a shelf for objects, such as, plants, pots, stereo equipment, and books, etc. Such objects are provided for context and are not intended as a limitation.

Returning to FIG. 5B, drawer 510 may be moveable to an open position as shown. In the open position, cabinet 500 may be configured to transform into a display system, such that images are generated and displayed for viewing. Specifically, drawer 510 may be moveable to an open position where projector 540 may be operated such that projector 540 projects light rays (images) onto the unrolled screen 520. Thus, by mounting or positioning projector 540 on a slidable member, such as drawer 510, projector 540 may be disposed outward from the face of cabinet 500 when in use, and when not in use, drawer 510 (and thus projector 540) may be slid into a substantially stored configuration. Thus, in some embodiments, one or both the projector and screen may be hidden from view when not in use.

It should be appreciated that cabinet 500 may enable projector 540 to be selectively positioned relative screen 520. By selectively positioning projector 540 relative screen 520, it may be possible to selectively control the size of the image displayed on screen 520. For example, the projector may be positioned a first distance from lens system 550 such that the image generated by projector 540 is of a first size. By moving projector 540 to a different position, projector 540 may be a second distance from screen 520. The size of the image may vary depending on the distance that the projector is relative the screen. Thus, in some embodiments, a first distance for the projector 540 relative screen 520 may produce an image of a first size, while a second distance for the projector 540 relative screen 520 may produce an image of a second size. Such motion may effectively produce a zoom feature for the projector. In some embodiments, drawer 510 may be preconfigured to generate images of select sizes. For example, a user may select an image size based on the content of the image. For example, movies images may be displayed in a larger format than data presentation images. As another example, a user may select an image size based on the size of the screen. And as indicated below, by lowering an adjustable focus, it may be possible to provide such flexibility of image size while maintaining image quality.

It should be appreciated that one of the projector or the screen may be moved to enable such size adjustment. For example, any suitable means for providing relative motion between the screen and the projector may be used to position the projector and screen in at least a first position and a second position. Thus, in some embodiments, the means for providing relative motion between the screen and the projector may include slidably moving the projector substantially perpendicular to the screen. In other embodiments, the means for providing relative motion between the screen and the projector may include moving the screen a select distance from the projector.

A user may further be able to selectively size screen 520. For example, the screen may be moveable between a first position (where the screen is a first size) and a second position (where the screen is a second size). Such selective sizing of screen 520 may be useful to accommodate different type of images, such as movies, presentations, etc.

It should be appreciated that any suitable locking mechanisms, such as detents, may be used to selectively lock drawer 510 (or other moving element supporting projector 540) in select positions to generate images of a desired size.

In some embodiments, projector 540 may include focusing devices, such as, but not limited to, devices for manually or automatically adjusting focus and auto calibration devices, which may be useful to optimize the focus of the image based on the size of the image generated on screen 520 (as determined in some systems by the position of the projector and/or screen). By providing such features it may be possible to optimize the size of the image and the focus of the image. Such features may be manually or automatically set depending on the configuration of projector 540.

FIGS. 6A and 6B further illustrate an entertainment unit, including a projection unit, as indicated generally at 600. The entertainment unit may include a support structure for the projection unit, where the projection unit may include a projector and a screen. Specifically in FIGS. 6A and 6B, projector 640 (shown in FIG. 6B) may be disposed in a slidable or moveable member or element, e.g. drawer 610, as described above. Drawer 610 may be integrated into a cabinet member 615. Alternatively, in some embodiments, cabinet member 615 may include one or more removable sections. For example, cabinet member 615 may be stackable above or below an entertainment center or television stands. Alternatively cabinet member 615 may be a stand-alone piece. Cabinet member 615 may be adapted to support or contain a separate visual and/or audio device, such as a television 660. Projector 600 may be selectively stored in drawer 610 when not in use such that television 660 is accessible to a user. Specifically, FIG. 6A shows cabinet 600 in a closed position, while FIG. 6B shows cabinet 600 in an open position. Such a configuration may be integrated into an existing entertainment center.

As with FIGS. 5A and 5B, projector 640 may be configured to generate and produce an image on screen 620. The position of projector 640 may be selectively varied to produce a desired sized image. Moreover, the configuration of the projector 640 may enable positioning of the projector substantially adjacent to screen 620. For example, projector 640 may include a wide angle lens system 650 as described in detail above in regards to FIGS. 2-4.

Figure 7B:
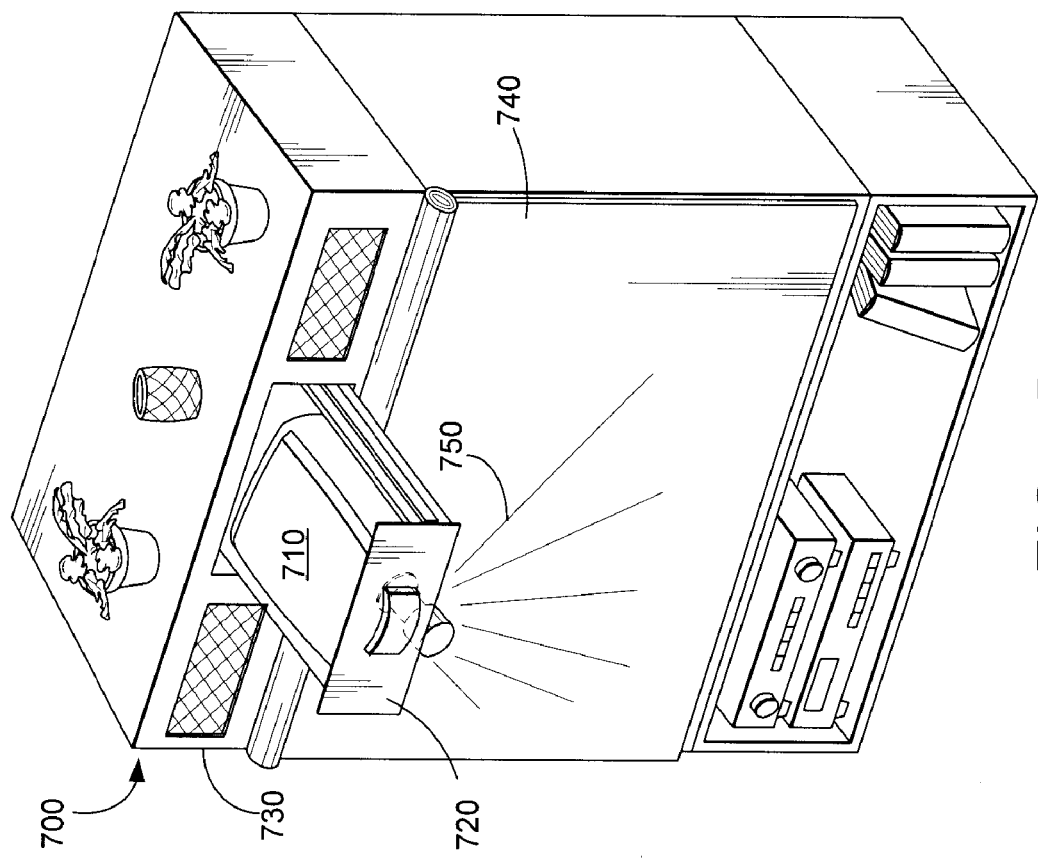
Figure 7A:
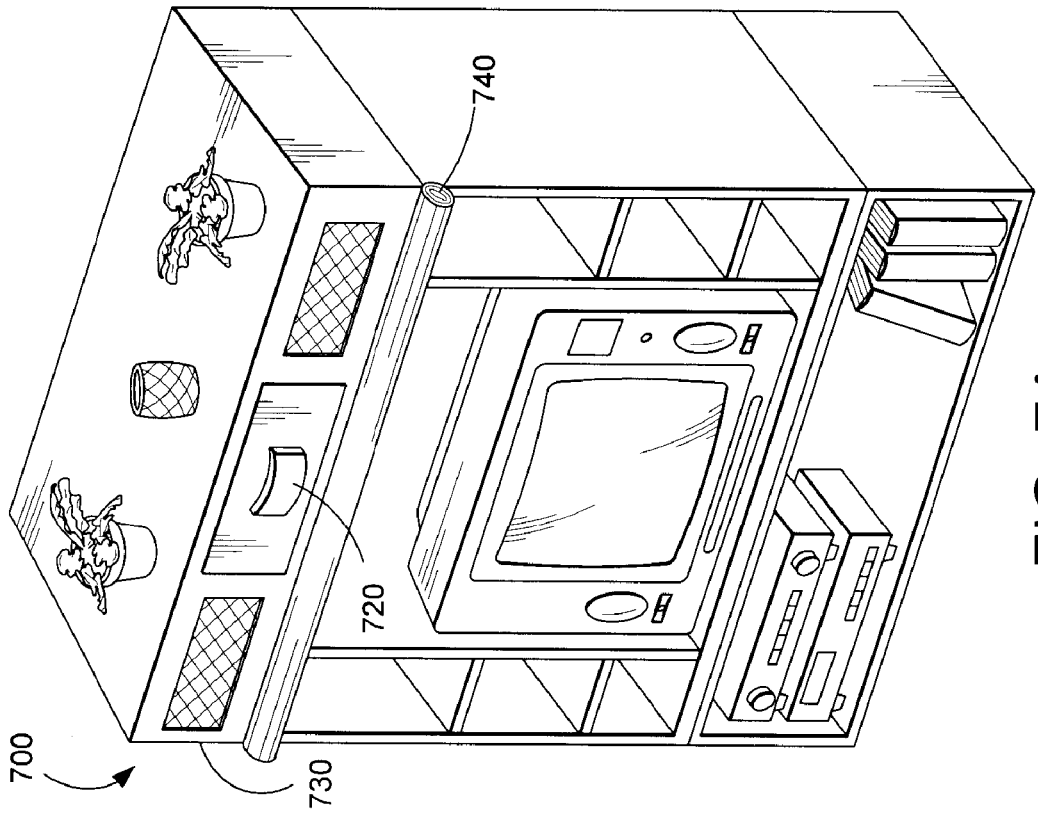

In another example, FIGS. 7A and 7B further illustrate another entertainment unit, including a projection unit, as indicated generally at 700. In the illustrated embodiment, projection unit 700 is disposed such that projector 710 (shown in FIG. 7B) is mounted to slidable element 720. Slidable element 720 may be configured to selectively position projector 710 in a storage position (shown in FIG. 7A) and an operation position (shown in FIG. 7B). In the operation position, projector 710 may be extended from cabinet 730 such that images generated by projector 710 may be directed toward screen 740. Specifically, projector 710 may be mounted to a slidable element such that during operation, an image may be projected downward onto screen 720 as indicated by rays 750. As with the other embodiments described and illustrated herein, there may be one or more operation positions. Such operation positions may be selectively chosen depending on the size of the image to be projected onto screen 740. Moreover, the focus may be adjustable to accommodate such image size changes.

It should be noted that in the illustrated embodiment, screen 740 is mounted to a bottom, front edge of cabinet 730 such that the screen 740 hangs downward during use as shown in FIG. 7B. It should be appreciated that screen 740 may be linked to cabinet 730 in any number of ways. For example, the screen may be attached to the bottom portion of the unit and drawn upwards during operation, such as the embodiments shown in FIGS. 5A, 5B, 6A, and 6B. Alternatively the screen may be attached to the side of the unit and drawn to the side of the unit during operation.

Screen 740 may be stored in any suitable manner when not in use. For example, screen 740 may be stored in a rolled position as indicated in FIG. 7A. Alternatively, in other embodiments, the screen may be permanently positioned in an operation position.

As with the other embodiments, FIGS. 7A and 7B show various other objects, such as plants, pots, stereo equipment, television, and books, for context, which may be positioned within or on the unit. Such objects may make the unit more versatile than previous units.

Referring now to FIGS. 8A and 8B, still other alternative embodiments are illustrated. In FIG. 8A, an overhang unit 800 is shown which may be mounted or otherwise secured to a wall 820 or other substantially vertical surface. The overhang unit may include a slidable member 810 which may be selectively moveable between a storage position, shown in FIG. 8A, or an operation position, shown in FIG. 8B.

Although shown as an overhang unit, it should be appreciated that in some embodiments, projector 850 may be directly attached to wall 820 without the cabinetry shown in FIGS. 8A and 8B. In such a configuration, screen 830 may be affixed to the wall. In other words, the screen may be "hung" from wall 820 or from overhang unit 800. In some embodiments, screen 830 may include an outer frame which may hold the screen flat. In other embodiments, the screen may be held flat due to the tension in the hanging screen as a result of the pull of gravity. Other methods may be used to hold or retain the bottom and opposing sides of the screen. Although not required, in some embodiments, screen 830 may be storable in a storage configuration.

In the illustrated embodiment, screen 830 may be stored during nonuse in a rolled configuration or other suitable configuration. In the stored configuration, wall hangings, such as picture 840 may be visible to a viewer. It should be appreciated that the picture and table and lamps are shown for context and are for illustrative purposes only. The illustrated embodiment enables a user to selectively use the projector without having to significantly alter a room or the wall space in the room. Thus, a user may use the projection device without removing pictures, photographs, etc. from the wall or wall space.

In some embodiments, projector 850 may be supported by a cabinet type structure 860 or the like. Cabinet 860 and/or projector 850 may be mounted to wall using mounting structures, such as brackets 870 or other suitable devices. Brackets 870 may be composed of a variety of materials, including but not limited to wood, metal, plastic, etc. In some embodiments, brackets 870 may be configured to mimic various types of decorating styles. In the example shown in FIGS. 8A and 8B, the brackets 870 are triangular in shape. Note, however, that various other mounting approaches can be used to mount cabinet 800 to wall 810, such as ceiling supports, ceiling wires, legs to the floor, etc. Any number of brackets may be used to support cabinet 860 and/or projector 850. Further still, combinations of different types of mounting approaches could be used, if desired.

As with the previously described embodiments, projector 850 may be selectively positioned in an operable position. Projector 850 may be configured to project an image (as indicated by rays 880) to screen 880. For example, projector 850 may be contained within the slidable member 810 such that it is positioned at a select distance from screen 880. Alternatively, in some embodiments, projector 850 may be supported in a fixed position relative screen 880 such that projector 850 has only an operation position.

It should be appreciated that the units above may make it easier to mount and use a projection device. For example, in some embodiments, a projection device may be integrated or partially integrated into a previously used entertainment center or television stand. Moreover, such projections units as described may be used in rooms with vaulted ceilings or high ceilings unlike previous ceiling mounted front projection display devices which were difficult to use in such conditions.

The configuration of the lens system described in relation to FIG. 3 may make the projector substantially lightweight and compact such that it may easily be mounted in the mounting systems and entertainment units described above. However, it should be appreciated that any suitable lens systems may be integrated within the projector. The lightweight and compact projection units described above may be easily portable and storable.

Also, various other types of cabinets or mounting systems may be used that are different in shape and/or style than those described above. For example, a cabinet-type structure may be mounted into wall 810 so that the front side is flush with wall 810. In this way, the projector may be adapted to slide out and project an image directly on a wall, if desired. Alternatively, the image may be projected onto the moveable screen which is supported by wall 810 to have improved flatness. In still another alternative embodiment, the projector may be configured to be mounted directly to a wall and/or placed substantially adjacent to a wall on which a screen is mounted (or no screen could be used).

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment and such features, structures and/or characteristics may be included in various combinations with features, structures and/or characteristics of other embodiments.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A projection system, comprising:
    a projection screen having at least a deployed configuration in which a viewing portion of the screen is substantially planar and a retracted configuration in which the screen is substantially hidden and occupies less space than when in the deployed configuration;
    a projector including a wide-angle lens system to selectively project display images onto the projection screen when the projection screen is in the deployed configuration, wherein the wide angle lens system defines an image path whereby the image path includes a change in direction; and
    a projector holder to support the projector, the projector holder being moveable relative to the projection screen land having at least an operating position at which the projector is supported for projection onto the projection screen when the projection screen is in the deployed configuration and a storage position at which the projector is substantially hidden.

2. The projection system of claim 1, wherein the projector is supported substantially behind a viewing plane of the projection screen when the projector holder is in the storage position.

3. The projection system of claim 1, wherein the projector holder includes a drawer.

4. The projection system of claim 1, wherein the projector holder moves away from the viewing portion of the screen to the operating position.

5. The projection system of claim 1, wherein the projector holder is positioned above the projection screen.

6. The projection system of claim 1, wherein the projector holder is positioned below the projection screen.

7. The projection system of claim 1, wherein the wide angle lens system includes a relay lens stage adapted to generate a distorted intermediate image and a wide angle lens stage adapted to substantially cancel the distortion of the distorted intermediate image.

8. The projection system of claim 1, wherein the image path includes an approximately 180-degree change in direction.

9. An entertainment center comprising:

a support structure;

a moveable screen mounted to the support structure; and a front projector to generate an image, wherein the front projector is slidably coupled to the support structure such that the front projector is substantially adjacent the screen to project an image to the screen at an angle of at least 30 degrees, said front projector further including a lens system defining an optical path which changes direction by approximately 180 degrees.

10. The entertainment center of claim 9, wherein the lens system includes a wide angle lens stage.

11. The entertainment center of claim 9, wherein the screen is moveable between an open position and a storage position.

12. An entertainment center comprising:

a support structure; and a front projector to generate an image, wherein the front projector is slidably coupled to the support structure such that the front projector is substantially adjacent a viewing surface to project an image to the viewing surface at an angle of at least 30 degrees, wherein the viewing surface includes a screen.

* * * * *